United States Patent
Flávio de Macedo

(10) Patent No.: US 7,137,176 B2
(45) Date of Patent: Nov. 21, 2006

(54) ARRANGEMENT INTRODUCED IN AN ELECTRONIC DEVICE FOR THE IDENTIFICATION OF APPAREL GOODS WITHIN PRODUCTION CHAIN

(75) Inventor: Milton Flávio de Macedo, São Paulo (BR)

(73) Assignee: Global ID South América Ltda., Sao Bernardo do Campo (BR)

( * ) Notice: Subject to any disclaimer, the term of this patent is extended or adjusted under 35 U.S.C. 154(b) by 142 days.

(21) Appl. No.: 10/506,898

(22) PCT Filed: Feb. 27, 2003

(86) PCT No.: PCT/BR03/00026

§ 371 (c)(1),
(2), (4) Date: Sep. 7, 2004

(87) PCT Pub. No.: WO03/075318

PCT Pub. Date: Sep. 12, 2003

(65) Prior Publication Data

US 2005/0121479 A1    Jun. 9, 2005

(30) Foreign Application Priority Data

Mar. 4, 2002    (BR) .............................. 8200345 U

(51) Int. Cl.
*A44B 1/08*    (2006.01)
*A44B 1/04*    (2006.01)

(52) U.S. Cl. ..................................... 24/104; 24/90.1

(58) Field of Classification Search ................ 24/90.1, 24/94–96, 113 R, 113 MP, 114.4, 114.05, 24/114.9; 40/1.5

See application file for complete search history.

(56) References Cited

U.S. PATENT DOCUMENTS

| 4,215,388 A | * | 7/1980 | Reimann ....................... 40/1.5 |
| 4,531,310 A | * | 7/1985 | Acson et al. .................. 40/1.5 |
| 4,928,362 A | * | 5/1990 | Collas et al. ............... 24/114.4 |
| 2006/0007668 A1 | * | 1/2006 | Chien .......................... 362/103 |

FOREIGN PATENT DOCUMENTS

| DE | 19733596 | | 2/1999 |
| DE | 10113384 | | 9/2002 |
| JP | 200242100 | | 9/2000 |
| JP | 2000132102 | | 11/2001 |
| WO | 2005-071853 | * | 3/2003 |

* cited by examiner

*Primary Examiner*—Robert J. Sandy
*Assistant Examiner*—Ruth C. Rodriguez
(74) *Attorney, Agent, or Firm*—Wolf Black Schorr & Solis-Cohen LLP

(57) ABSTRACT

Arrangement in a device for identifying counterfeit apparel including a cylindrical button body (1) coupled to a circular base, (2) forming a circular space (4) housing an encapsulated assembly formed by a chip (6) and an antenna (5). The encapsulated assembly forms an opening that receives a plastic plug (7) which has a lower circular flap located in a hole provided on the button base. A locking pin is coupled to the button body. Alternatively, the button body is forms a circular guide (11) which is concentric to the assembly. The button body has a terminal circular flap (12) configuring an opening (10) between the internal walls of the button base (2) and the circular flap (12). The chip (6) stores data through programmed codes in a logical sequence containing a fixed code identifying the apparel article and a flexible code to save complementary information on the apparel.

2 Claims, 2 Drawing Sheets

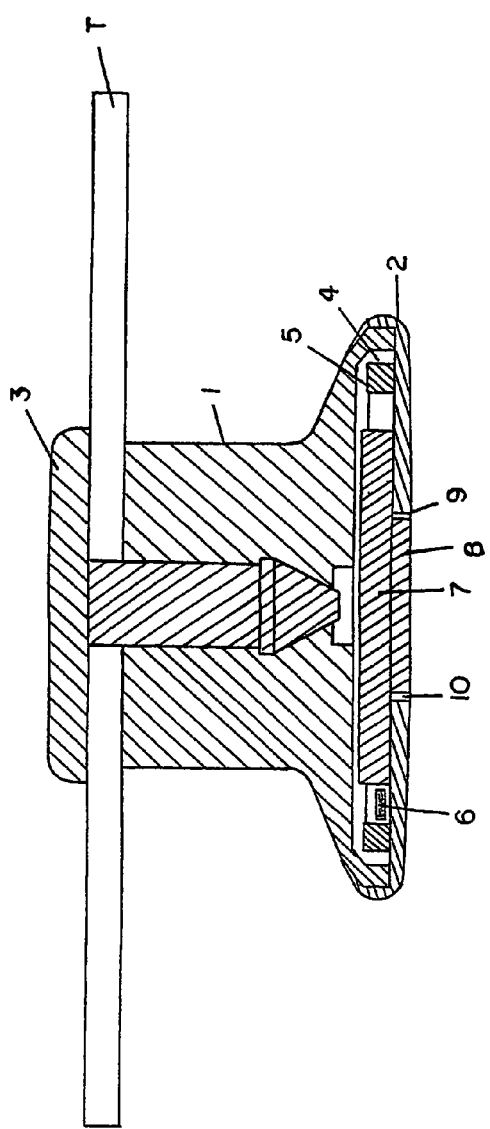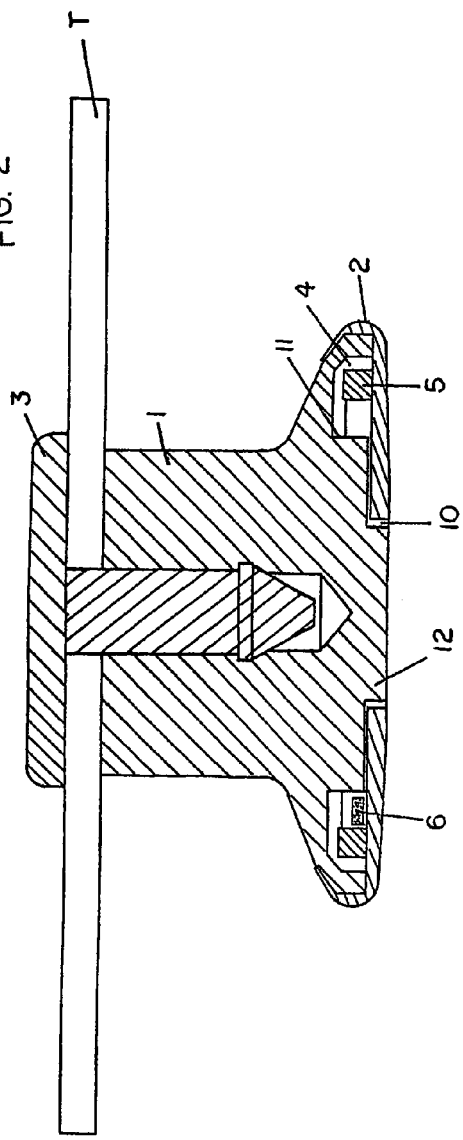

ARRANGEMENT INTRODUCED IN AN ELECTRONIC DEVICE FOR THE IDENTIFICATION OF APPAREL GOODS WITHIN PRODUCTION CHAIN

FIELD OF THE INVENTION

It refers to an application of a Utility Model patent dealing with an electronic device designed according to a new arrangement, through which it is possible to identify apparel goods according to their novelty within the production chain, with the purpose of establishing a fully faithful and efficient way for said control.

BACKGROUND OF THE INVENTION

The market has been more and more invaded by counterfeit products on several fields of activity, constituting an aggressive and notorious way to prejudice manufacturers, retailers and consumers in general, who often purchase products under famous brands or trademarks or with wide market reputation as original, when in fact they have an unknown origin. Besides all problems, this is also an evident way to prejudice the treasury, since said products are usually manufactured illegally, not paying taxes and other duties.

Such occurrences have become intense due to the increasing need of manufacturers of apparel articles, especially those bearers of famous labels or trademarks, to outsource their products, that is, pass on some manufacturing steps to small manufacturers, which however should keep the quality standards of the corresponding trademark.

This procedure has as purpose to reduce financial costs and increase productivity, but has however generated the possibility of parallel negotiations between such small manufacturers and stores or department stores, potentially considered as product re-sellers, thus imposing natural losses to the bearers the trademarks who have invested considerable amounts to reach their commercial goals.

Several apparel articles are provided with different ways of identification of their origin or manufacturer. Paints, shirts and others have buttons with the trademark printed on them, besides the traditional label.

As the time went by, labels proved to be easily fakeable, the same happening to the called buttons. For these reasons, counterfeit products, ignoring trademark and tax rights, end up arriving at the market with the same quality as the original product.

In the fight to solve such problems, the inventor has created an electronic device installed on said button, whose patent application in Brazil was filed on Jun. 19, 2000 under no. MU 8001255-8. Said application is provided with an electronic device installed on the paints, shirt, jacket, shoe, purse or similar, to be installed during the last step of manufacture of the apparel article, by means of a "small chip forming a circuit with a receiving antenna, when closed, with said circuit storing a fixed code to identify the article and/or also a flexible code for eventual complementary information".

Still according to the description of the previous application, "such codes will be read by A RFID-type reader (by means of an identification system by radio frequency) by e.g. a brand auditor and the retailer employee himself/ herself, whenever required for internal control".

The description report of the previous application also discloses: "This way, full control of the origin of given batches is obtained by the label owner, allowing to find out if it has been manufactured according to usual processes (by means of reading the fixed code) and there is also a possibility for the internal control at the store itself by its employees (by means of reading the flexible code, which can allow the inclusion of complementary information on the chip)"

MU 8001255-8 further discloses that: "By means of sequential recording of programmed codes, the chip can even be detected by third parties, but a copy is nevertheless nearly impossible to be carried out, since the code sequence can be reached from endless combinations.

The description finally states that: "After reading, to identify the clothe, collected information may be downloaded in a center comprising a PC or any other computer for better control and required steps."

SUMMARY OF THE INVENTION

Although the electronic device disclosed by MU 8001255-8 has been a very efficient solution for the purposes of solving the problems existing in the state of the art technique, the inventor has found a few aspects subject to be improved, so as to impose full technical and functional efficiency, besides fully eliminating any possibility of damage to the assembly.

With this purpose in mind, a first aspect examined by the inventor consists that, in the previous application, the button to be applied to the clothe was made of metal, which could eventually block the electromagnetic field. For this reason, such electromagnetic field could sometimes impose blocking to the communication by radio frequency signals between the reader and the chip, due to restrictions to wave propagation.

For this purpose, so to present an ever-efficient communication between the reader and the chip, the inventor presents two new constructive arrangements: in the first one, the button includes, after its assembly stages, a plastic plug on its base, through which the waves propagate naturally; in the second one, the button body is fully manufactured with engineering plastic material. In such a way, any eventual reading error is eliminated, thus always assuring fidelity on the originality or not of the article being examined.

Another issue evaluated in the shown state of the art technique is the fact that, due to constant washing of apparel articles, notably washing by whirling, the possibility of entrance of water into the internal side of the assembly, by transference through the clothe itself, has been verified.

In this particular, the inventor has taken the antenna plus chip assembly and has given to it, prior to the button closing or nailing, a hot plastic encapsulation, so that, even if eventually reached by liquid during washing or daily use, said assembly remains protected.

On the other hand, the previous state of the art technique has not promoted any definition concerning chip localization, with FIG. 1 of the previous patent application randomly showing said chip in a central position within the antenna (2). The inventor has discovered that such lack of definition could lead to a not always appropriate localization of said chip in the assembly line, thus causing eventual "crushing" which would make the corresponding chip become useless, even because its manufacture with silicon results in an extremely fragile piece.

In this new construction arrangement, the inventor has provided the chip in a lateral position, near the internal side of the edge of the antenna, which would promptly and fully eliminate the possibility of "crushing", since it is located in a specific placement.

In this proposal, the assembly consists of a substantially cylindrical body of button which receives a nailed base, so to compose a placement to receive the assembly consisting of chip and antenna (previously encapsulated), with such encapsulation resulting in an opening to concentrically receive a plug, and such plug projecting a lower flap located in a hole provided at the base of the button, thus configuring a small opening. Finally, the locking pin is nailed to the button body.

In this proposal, the basic difference to the previous proposal is the elimination of the plastic plug, but giving to the button body an engineering plastic composition. Further features are kept, such as the previous encapsulation of the chip plus antenna assembly, as well as the nailing between body and base of the button for final application of the locking pin.

BRIEF DESCRIPTION OF THE DRAWINGS

FIG. 1: shows a lateral section of the first mentioned construction, in which the chip, antenna and plastic plug can be seen;

FIG. 2: shows a lateral section of the second mentioned construction, in which the chip and antenna can be seen;

DETAILED DESCRIPTION OF THE INVENTION

Figure 3:
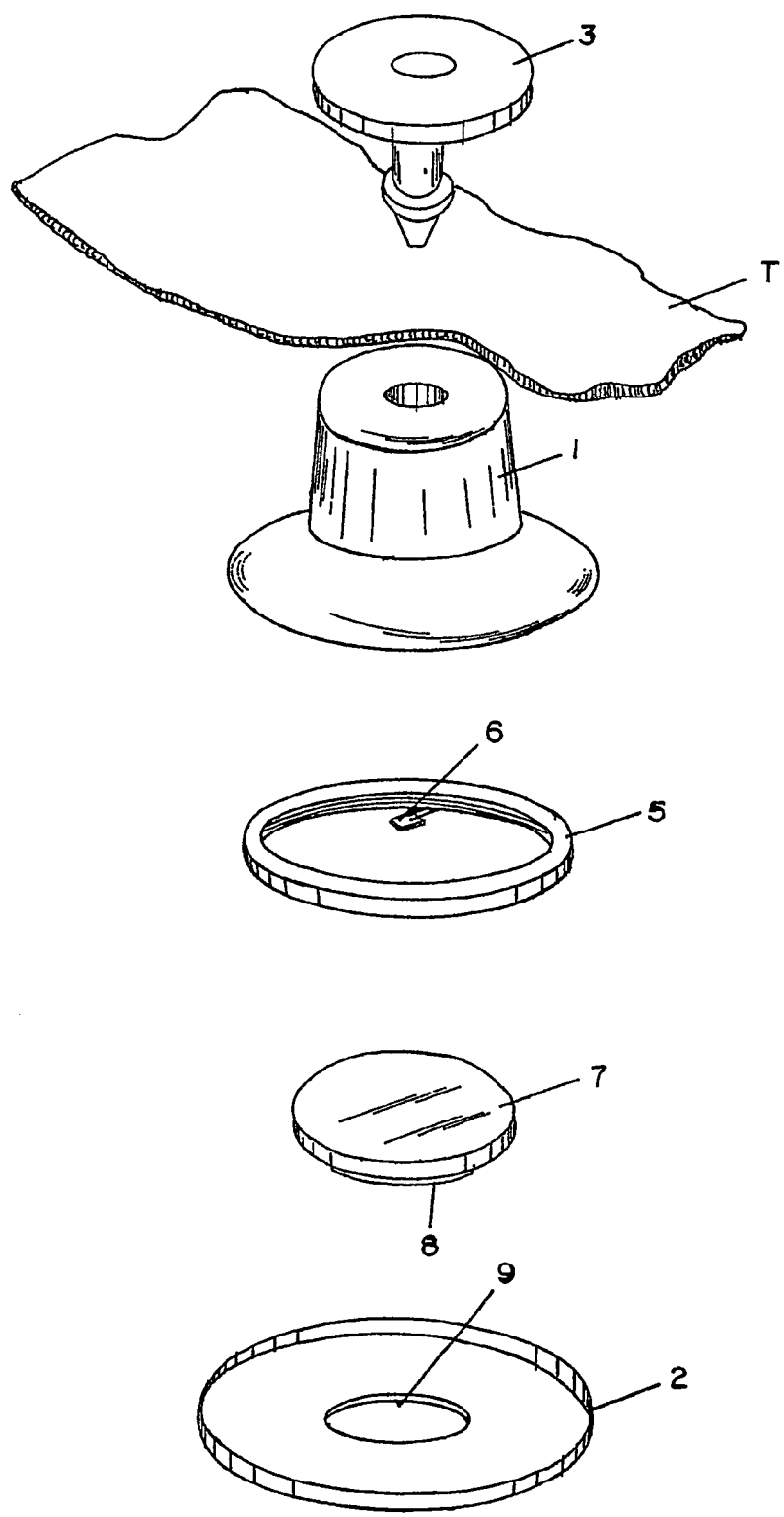
FIG. 3: general blown view of said first construction, including a clothe section for better understanding.

According to FIG. 1, there is a first construction for the new arrangement introduced in an electronic device for identification of apparel articles within the production chain, in which a body of button (1) made of metallic material can be seen, which has been nailed through a conventional method to the base of the button (2), (DELETE) also made of metal. The figure also shows a metal locking pin (3) which is fixed, also through a 5 conventional method, to said button body (1), fixing between them the cloth (T) of the apparel article. With such arrangement, the front face of the locking pin (3) remains exposed to the apparel article, while the rest of the assembly remains internally located within said apparel article.

The novelty of this construction consists of the creation of a placement (4) between said button body (1) and the base of the button (2), in which a previously hot encapsulated assembly by plastic film is located, consisting of a ring antenna (5) and a silicon chip (6) laterally located near said antenna (5), i.e. near to its internal edge. From said encapsulation, a central hole results to pass an engineering plastic plug (7) consisting of a circular body with diameter compatible to said hole, being said plastic plug (7) provided with a 15 terminal flap (8) with smaller diameter which is located inside a hole (9) provided central and concentrically on the base of the button (2), thus resulting in an opening (10) between the walls of said hole (9) and said terminal flap (8) which is given by a small diameter difference.

The silicon chip (6) stores data by means of programmed codes in a logical sequence containing a fixed code to identify the apparel article and a flexible code to save complementary data on said apparel article.

The model assembly requires initially the encapsulation of the assembly consisting of the antenna (5) and the silicon chip (6). Then, the button body (1) should be nailed to the base of the button (2), with the encapsulated assembly formed by antenna (5) 25 and chip (6), plus the plastic plug (7) located in its placement (4), so that the locking pin (3) is finally applied to the button body (1), so to fix the cloth (T) of the apparel article in that operation.

FIG. 3 shows said first construction with blown parts, before said encapsulation.

FIG. 2 shows a second construction of the model, which main difference to the described construction consists of the elimination of the plastic plug. However, since the 5 communication by radio frequency between the chip (6) and the reading device (not shown) requires, according to the effected tests and as previously described, the elimination of an eventual electromagnetic field blockage, the button body (1) is now made of engineering plastic. Such construction preserves the placement (4), since the plastic encapsulation of the assembly consisting of the antenna (5) and the silicon chip (6); while said button body 10 (1) forms a circular guide (11) which is concentric to said antenna (5) plus chip (6) assembly, with said terminal circular flap (12) playing exactly the role of the flap (8) of the previous construction, configuring an opening (10) between the internal walls of the base of the button (2) and the circular flap (12).

In this second construction, the set assembly follows a sequence compatible to that described for the first construction, i.e.: the circular antenna (5) plus silicon chip (6) assembly is hot encapsulated by plastic film; the button body (1) is then nailed to the base of the button (2), with said previously encapsulated assembly introduced within the placement (4); so that finally apply the locking pin (3) fixing the cloth (T).

Therefore, according to the new constructive arrangement in its two proposals, the model allows for perfect communication by radio frequency between the reader (not shown) and the silicon chip (6), since the elimination of the possibility of blocking the electromagnetic field with a "shield" guarantees such a success. Therefore, as reported in the previous patent application from the same inventor, a lot or batch of apparel articles can be identified as legitimate by radio frequency reading; in case the employed button is not provided with a chip with the previously installed codes, the person in charge of reading will promptly identify it as not being an original product. With the new constructive arrangement, presented herein, there is now full assurance of the originality or not of the investigated product, since no reading errors can occur.

On the other hand, we can verify that the lateral localization of the chip (6) inside the circular antenna (5), as well as the encapsulation process, eliminates any possibility 5 of "crushing" the chip during the assembly; besides avoiding that water to directly reach said chip (6) by conduction through the cloth.

The invention claimed is:

1. ARRANGEMENT INTRODUCED IN AN ELECTRONIC DEVICE FOR AN IDENTIFICATION OF APPAREL ARTICLES WITHIN A PRODUCTION CHAIN, comprising:
   a button having a body (1) of plastic material and a base (2), wherein said body (1) is coupled to said base (2);
   a metal locking pin (3) fixed to said button body (1), wherein a cloth (T) of the apparel article is fixed between said metal locking pin (3) and said button body (1);
   a space (4) between said button body (1) and the base of the button (2), in which an assembly encapsulated by plastic film is located,
   said assembly formed by a ring antenna (5) and a silicon chip (6) laterally located near said antenna (5); said assembly forms a central first hole for passing an engineering plastic plug (7) with a compatible diameter to said first hole into said first hole;

wherein said plastic plug (7) provided with a terminal circular flap (8) of smaller diameter located in a second hole (9) provided in the center of the base of the button (2), thus resulting in an opening (10) between the walls of said second hole (9) and said terminal circular flap (8) formed by a small diameter difference; and wherein the silicon chip (6) stores data through programmed codes in a logical sequence containing a fixed code to identify the apparel article and a flexible code to save complementary information on said apparel article.

2. ARRANGEMENT INTRODUCED IN AN ELECTRONIC DEVICE FOR AN IDENTIFICATION OF APPAREL ARTICLES WITHIN A PRODUCTION CHAIN, comprising:

a button having a body (1) of plastic material and a base (2), wherein said body (1) is coupled to said base (2);

a metal locking pin (3) fixed to said button body (1), wherein a cloth (T) of the apparel article is fixed between said metal locking pin (3) and said button body (1);

a space (4) between said button body (1) and the base of the button (2), in which an assembly, encapsulated by a previously hot plastic film, is located; wherein said assembly is formed by a ring antenna (5) and a silicon chip (6) laterally located near said antenna (5);

said button body (1) forms a circular guide (11) which is concentric to said antenna (5) and chip (6) assembly, with a terminal circular flap (12) configuring an opening (10) between the internal walls of the base of the button (2) and the circular flap (12);

wherein the silicon chip (6) stores data through programmed codes in a logical sequence containing a fixed code to identify the apparel article and a flexible code to save complementary information on said apparel article.

* * * * *